United States Patent [19]

Kramer

[11] Patent Number: 4,702,274

[45] Date of Patent: Oct. 27, 1987

[54] QUICK DISCONNECT FOR SEWAGE SYSTEM

[75] Inventor: Dean C. Kramer, Mason City, Iowa

[73] Assignee: Martinson Manufacturing Company, Inc., Sheffield, Iowa

[21] Appl. No.: 875,070

[22] Filed: Jun. 17, 1986

[51] Int. Cl.4 ........................ F16K 15/14; F16L 37/26; F16L 43/00

[52] U.S. Cl. .................................. 137/515.5; 137/855; 137/858; 285/179; 285/325

[58] Field of Search ...................... 137/515, 515.5, 855, 137/858; 285/179, 181, 325

[56] References Cited

U.S. PATENT DOCUMENTS

| | | | |
|---|---|---|---|
| 314,107 | 3/1885 | Chappell | 137/858 |
| 1,272,794 | 7/1918 | Girtanner | 285/179 X |
| 2,386,485 | 10/1945 | Longenecker | 137/858 X |
| 3,583,731 | 6/1971 | Jewell | 285/325 X |
| 4,011,532 | 3/1977 | Williams et al. | 285/325 X |
| 4,130,300 | 12/1978 | Sheridan | 285/179 X |

Primary Examiner—Alan Cohan
Assistant Examiner—John A. Rivell
Attorney, Agent, or Firm—Herman H. Bains

[57] ABSTRACT

A quick disconnect coupling device for connecting the vertical pipe from a submersible pump in a sewage system to a horizontal pipe includes male and female coupling members. The female coupling member is connected to the horizontal pipe and is coupled to the male coupling member by guideways which are engaged by guide elements on the male coupling member. The male member includes a pair of coupling elements which are connected together to form a 90-degree coupling. A flap type check valve is clamped between the coupling elements of the male coupling member and permits the flow of waste water through the coupling, but prevents the return flow of waste water to the submersible pump.

4 Claims, 3 Drawing Figures

QUICK DISCONNECT FOR SEWAGE SYSTEM

This invention relates to a coupling device and, more particularly, to a coupling device coupling the discharge outlet pipe of a sewage pump to a horizontal pipe.

BACKGROUND OF THE INVENTION

In many waste water or sewage systems, submersible pumps are used to pump the waste water or sewage from a tank or sump type receptacle. In a number of these systems, the waste water or liquid sewage is pumped through a vertical pipe, which is connected by a coupling to a lateral horizontal pipe. In these conventional sewage systems, a one-way check valve is disposed in the vertical pipe to prevent the return of waste water or liquid sewage into the tank or sump. In this kind of discharge arrangement, there are at least six connections between the pump outlet and the horizontal lateral pipe. The requirement for a large number of connections makes this kind of installation an expensive and labor-intensive operation.

SUMMARY OF THE INVENTION

An object of this invention is to provide a novel and improved quick disconnect coupling incorporating a check valve therein, which is used for coupling the vertical discharge pipe of a submersible pump with a horizontal pipe.

Another object of this invention is to provide a sewage system with an elbow type quick coupling device having a check valve therein, which is effective in reducing the number of connections between the vertical pipe of a submersible pump and a horizontal lateral pipe.

These and other objects of the invention will be more fully defined in the following Specification.

FIGURES OF THE DRAWING

DESCRIPTION OF THE PREFERRED EMBODIMENT

Figure 1:
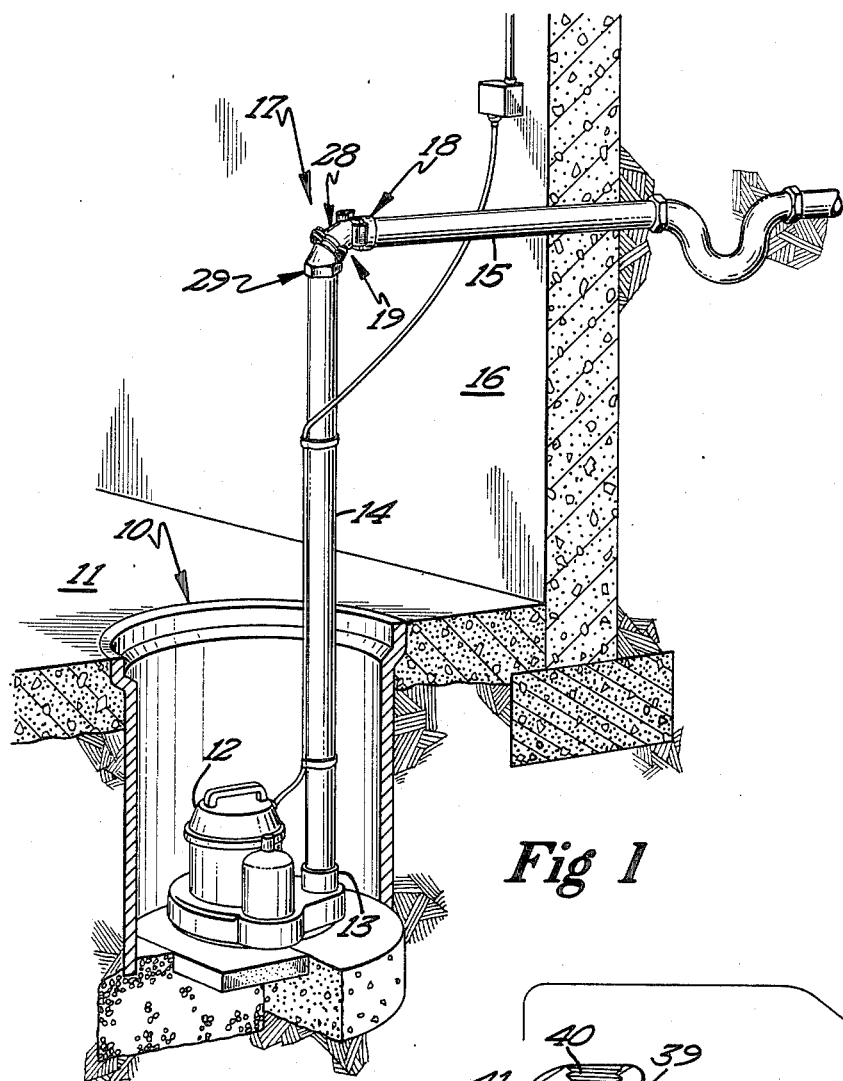
FIG. 1 is a perspective view of a sewage system utilizing a novel quick coupling device.

Referring now to the drawings and, more specifically, to FIG. 1, it will be seen that a typical sump 10 is formed in the floor 11 of a conventional building structure, such as a residence, commercial building, or the like. A conventional commercial submersible pump 12 is positioned in the sump 10 and is provided with a conventional intake or inlet (not shown) and an outlet 13 through which the liquid sewage or waste water is pumped. An elongate vertical discharge pipe 14 is connected to the outlet 13 and the vertical discharge pipe is connected to a lateral horizontal pipe 15 by means of a quick coupling device 17. The lateral horizontal pipe 15 projects through an outside wall 16 of the building structure.

Figure 3:
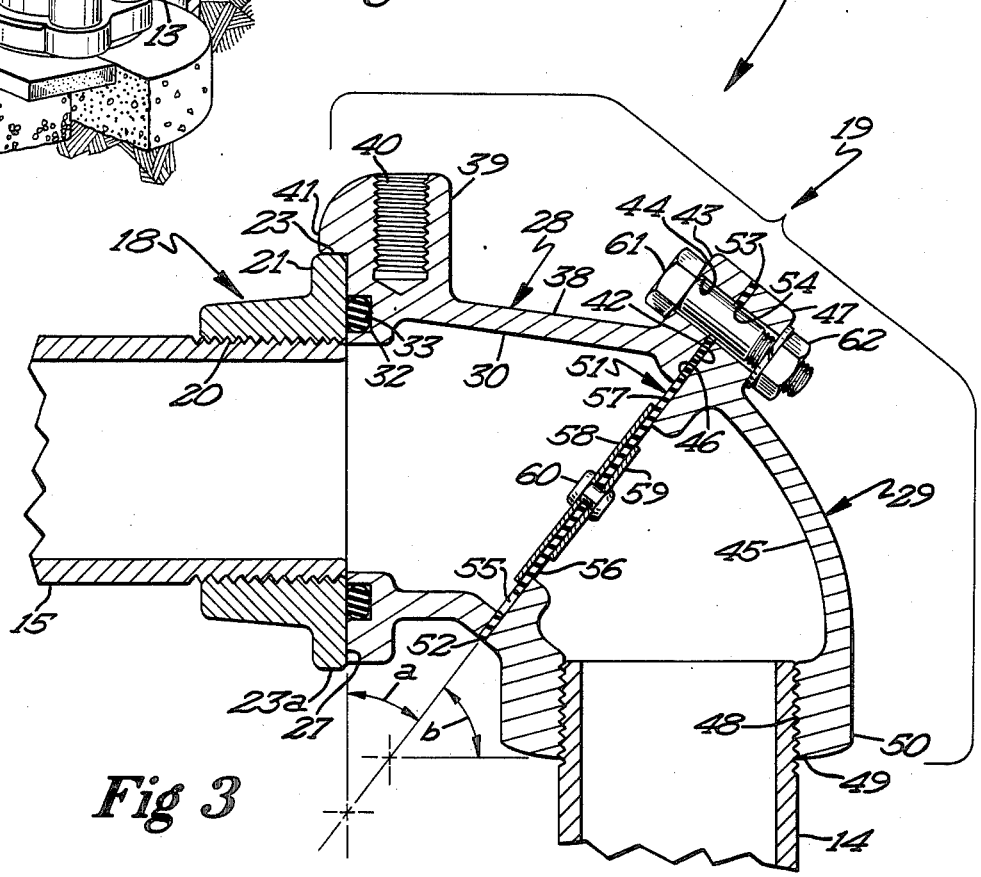
FIG. 3 is a cross-sectional view of the quick coupling device.
Figure 2:
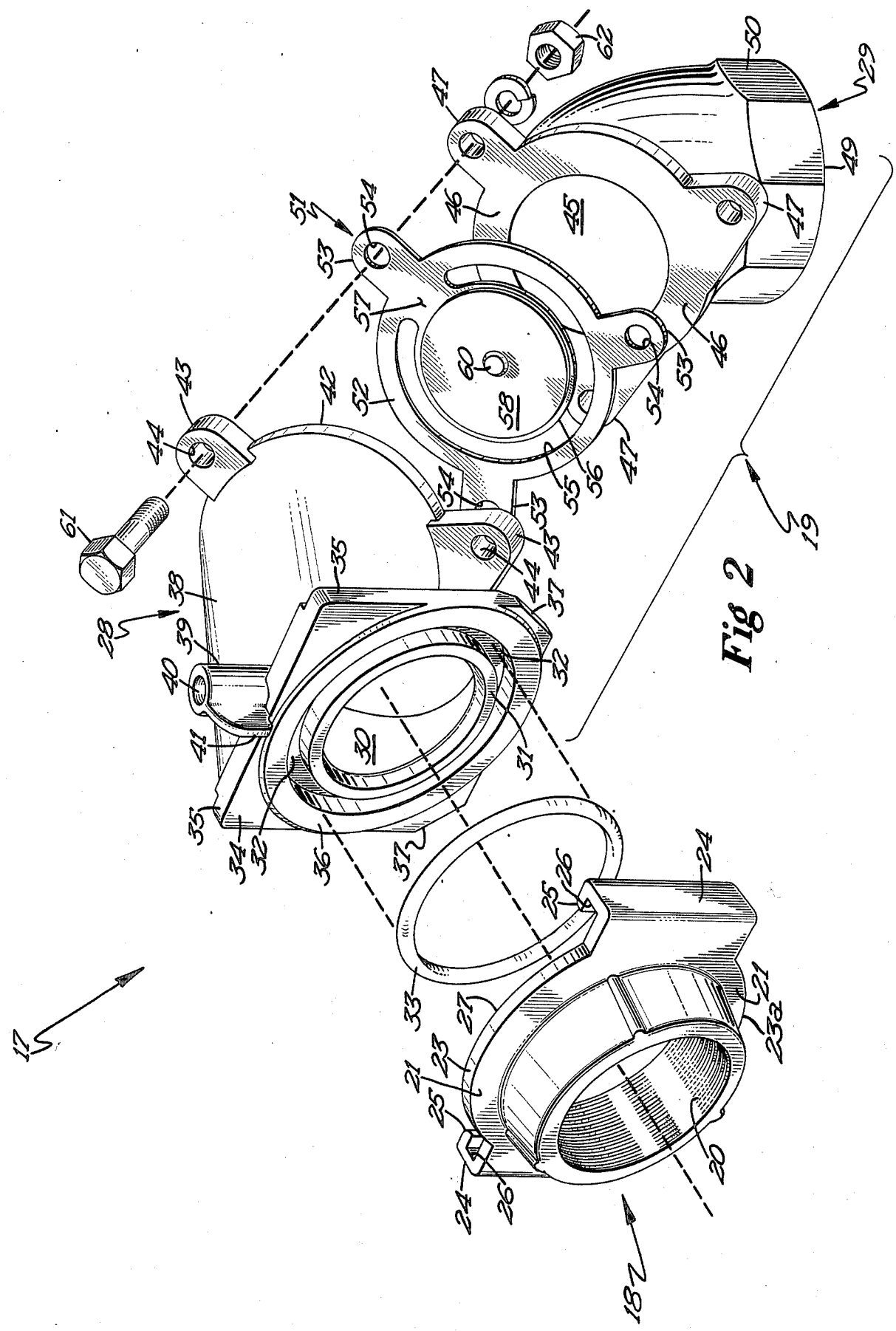
FIG. 2 is an exploded perspective view of the novel quick coupling device.

The quick coupling device 17 is comprised of a female coupling member 18 and a male coupling member 19. Referring now to FIGS. 2 and 3, it will be seen that the female coupling member 18 is of cylindrical configuration and the internal opening 18a therethrough is provided with internal threads 20, which threadedly engage the threaded end of horizontal pipe 15. The female coupling member 18 is also provided with an outwardly projecting flange 21, which includes laterally extending portions 22 at each side thereof. In this regard, it will be noted that the flange 21 is vertically disposed when the quick coupling device 17 is used to interconnect a vertical pipe with a lateral horizontal pipe.

It will also be noted that the flange 21 has an upper arcuate edge 23 and a lower arcuate edge 23a. Each of the lateral extending portions 22 of the flange 21 has a rearwardly extending flange element 24 integrally formed therewith which terminates in an inturned flange element 25. Each rearwardly extending flange element 24 is designed at substantially right angular relation with respect to the associated laterally extending portion 22 of the flange 21. Similarly, each inturned flange element 25 is arranged in substantially right angular relation with respect to the associated rearwardly extending flange element 24. It will be noted that the rearwardly extending flange element and the inturned flange element cooperate with the associated laterally extending portion to define a female guideway 26. It is again pointed out that the female guideways 26 are vertically oriented when the quick coupling device 17 couples the vertical pipe with a horizontal pipe. The female coupling member 18 is also provided with a generally annular substantially planar rear coupling face 27.

The male coupling member 19 is comprised of a coupling element 28 and a coupling element 29, which are secured together and which cooperate with each other to define a 90 degree elbow coupling. The coupling element 28 has an opening therethrough, which is circular in cross-section, and which is disposed in registering relation with the opening 18a in the coupling member 18 when the quick coupling device is in coupled relation. The coupling element 28 also has a substantially planar annular front coupling face 31, which has an annular groove 32 therein, which accommodates an O-ring type seal 33.

The coupling element 28 also has a front flange 34, which extends outwardly therefrom, and which defines a pair of vertically extending male guide elements 35. Referring now to FIG. 3, it will be seen that the vertically extending male guide elements each have a central portion 36, which has a greater thickness dimension than the remaining portions of the guide element. It will also be noted that each male guide element 35 has a beveled lower end 37, as best seen in FIG. 1. The male guide elements engage and slide in the female guideways 26 of the female coupling member 18 for coupling the coupling members together.

It will also be seen that the coupling element 28 has a substantially flat upper wall 38 having a vertically disposed tubular element 39 integral therewith and projecting upwardly therefrom. The tubular element 39 is provided with internal threads 40 for threadedly engaging the threaded lower end portion of a rod to facilitate coupling and uncoupling of the coupling members. The rod is used to elevate the male coupling member, the vertical pipe, and the submersible pump as a unit in a well-known manner. The tubular element 39 is also provided with a stop element or a tang 41, which projects forwardly therefrom and which engages the upper arcuate edge 23 and the female coupling member 18 when the coupling members are in complete coupled relation. When this occurs, the opening 18a in the coupling member 18 will be disposed in registering relation with the opening 30 in the coupling element 28.

The coupling element 28 is also provided with an annular substantially planar rear coupling face 42. The coupling element 28 is provided with a plurality of ears 43, which project laterally outwardly from the coupling element the rear face thereof. Each of the ears 43 has an opening 44 therethrough for accommodating a nut and bolt assembly in a manner to be described more fully hereinbelow.

In the embodiment shown, the rear surface of each ear 44 is coplanar with the rear coupling face 42 and three such ears are provided for the coupling element 28.

Referring again to FIGS. 2 and 3, it will be seen that the coupling element 29 has an opening 45 therethrough which is of circular and cross-sectional shape. The coupling element 29 is provided with a flat generally annular front coupling face 46 and ears 47, which project outwardly therefrom. The ears 47 have openings 47a therethrough and the front surface of the ears is coplanar with the front coupling face 46. The rear end of the coupling element 29 is internally threaded as at 40a and the coupling element 29 terminates in a rear face 49. The exterior rear surface of the coupling element 29 has a plurality of hexagonally arranged surfaces 50, which facilitate engagement thereby by a conventional plumber's wrench or the like.

The male coupling element 19 is also provided with a check valve structure 51, which is formed from a fiber reinforcement material, such as rubber, plastic, or the like. The check valve structure 51 is formed from a single blank of material and includes a sealing gasket and valve mounting member 52. The gasket and valve mounting member 52 is of generally circular configuration and has a plurality of ears 53 integral therewith and projecting outwardly therefrom. The ears 53 correspond in size, configuration, and number to the ears on the valve elements 28 and 29. Each of the ears 53 on the check valve structure has an opening 54 therein, each opening being disposed in registering relation with an opening in an ear in the valve elements 28 and 29.

The check valve structure 51 has a generally circular slot or space 55 cut therein, and this slot extends through an arc in excess of 280 degrees to define a substantially circular valve flap 56. The flap 56 is interconnected with the gasket and valve mounting member by an attachment portion 57. The portion 57 actually serves as a hinge or pivot for the valve flap 56.

A reinforcing stainless steel disc 58, having an area less than the area of one surface of the flap 56, is positioned against one surface of the valve flap. A smaller stainless steel disc 59 is positioned against the other surface of the valve flap 56, and these discs are secured together and to the flap by a rivet 60. Suitable bolts 61 extend through the openings in the ears 53 of the valve structure 51 and through the openings in the associated ears of the coupling elements 28 and 29. Nuts 62 engage the bolt and clamp the coupling elements and check valve structure together.

It is pointed out that the angle A defined by the intersecting planes of the front coupling face 31 and the rear coupling face 42 of the coupling element is 38 degrees. Similarly, the angle B defined by the front coupling face 46 and the rear face 49 of the coupling element 29 defines an angle of 52 degrees. These angles are critical in order to permit pivoting movement of the check valve flap 56. In this regard, the check valve flap 56 obstructs the registering openings between the coupling elements 28 and 29 when the valve is in closed condition and prevents the return flow of waste water and sewage into the sump 10. However, the flap 56 may be readily shifted to an open condition in response to the fluid pressure produced by the submersible pump 12 during the pumping operation to allow the waste water to be discharged from the sump.

During installation of the quick coupling device 17, the female coupling member 18 will be threadedly connected to the threaded end portion of the lateral horizontal pipe 15. Similarly, the male coupling member 19 will be threadedly connected to the upper end portion of the vertical pipe 14, which, in turn, is connected to the outlet 13 of the submersible pump 12. Again, it is pointed out that the upper end portion of the vertical pipe 14 is threaded and threadedly engages the threaded rear or lower end portion of the coupling element 29.

Typically, the male and female coupling members will be respectively coupled to the vertical and horizontal pipes, and the male and female coupling members will then be coupled together by sliding the vertically extending male guide elements 35 into the female guideways 26 until the stop element 41 on the male coupling element engages the upper arcuate edge 23 of the flange 21 of the female coupling member. During operation of the submersible pump, waste water or sewage under pressure will be forced upwardly through the pipe 14 and through the quick coupling device 17 into the horizontal lateral pipe 15. The liquid pressure will force the valve flap 56 to the open position to permit the flow of the liquid material therethrough. In the event that the lateral horizontal pipe 15 is connected to a main line sewage conduit which becomes clogged, then the return flow of the liquid would readily close the check valve flap 56.

The quick coupling device 17 not only permits the ready connection and disconnection between the vertical pipe 14 and the horizontal pipe 15, but also eliminates the need of a number of separate connections required by most commercial systems. The quick coupling devices have heretofore never included a coupling member which had an elbow-type configuration. Certainly, none of these quick coupling devices incorporate a check valve in an elbow-type device of the type disclosed herein. By utilizing the novel elbow-type quick coupling device, which incorporates a check valve, a user will eliminate a large number of connections which require a labor-intensive and expensive installation procedure attendant with the conventional systems.

Thus, it will be seen that I have provided a novel and improved quick coupling device, which is not only of simple and inexpensive construction, but one which functions in a more efficient manner than any heretofore known comparable coupling device.

What is claimed is:

1. A quick disconnect coupling device for coupling a vertical discharge conduit of a sump pump to a horizontal conduit through which waste water is discharged, comprising:

a pair of coupling members coupled together in communicating relation, one of said coupling members being connected to the vertical discharge conduit of the sump pump and the other coupling member being connected to the horizontal conduit, said one coupling member comprising a pair of coupling elements connected together in communicating relation, each of said coupling elements having a substantially planar front coupling face and a substantially planar rear coupling face disposed at an angle with respect to the associated front coupling face thereof, the included angle defined between the front coupling face of one coupling element and the rear coupling face of the other coupling element being 90 degrees, whereby said one coupling member defines a 90-degree elbow, a one-way check valve positioned between and secured to said coupling elements, said check valve comprising a flap hingedly connected between said coupling elements and being swingable to an open position in response to fluid pressure produced by the sump pump and being swingable to the closed position obstructing the flow of liquiid through the quick disconnect coupling device in the return direction, said check valve being disposed in inclined relation with respect to the horizontal conduit, one of said coupling elements being connected in communicating relation to the vertical discharge conduit, the other of said coupling elements having vertical substantially straight guide elements integral therewith and projecting laterally outwardly from opposite sides thereof, said other coupling member being of single piece construction and having a pair of vertical substantially straight guideways adjacent the marginal portions thereof and being engaged by the guide elements of said other coupling element when said coupling members are coupled together, means on the upper portion of said other coupling element engaging said other coupling member when said coupling members are in coupled relation to position said coupling members in registering relation with respect to each other.

2. The quick disconnect coupling device as defined in claim 1 wherein the included angle between said front and rear faces of said one coupling element comprises an angle of approximately 52 degrees.

3. The quick disconnect coupling device as defined in claim 2 wherein the included angle defined between the front and rear coupling faces of said other coupling element comprises an angle of approximately 38 degrees.

4. A quick disconnect coupling device as defined in claim 1 and means defining a sealing gasket and mounting member integral with said check valve flap and being positioned exteriorly thereof and permitting hinging movement therebetween, said sealing gasket and mounting member being clamped between the coupling elements comprising said one coupling member.

* * * * *